(12) United States Patent
Zhang et al.

(10) Patent No.: US 12,409,554 B2
(45) Date of Patent: Sep. 9, 2025

(54) APPARATUS AND A METHOD FOR REMOVING COATINGS BY USING LASER

(71) Applicants: Mingfeng Zhang, Scarborough (CA); Xing Yuan, Markham (CA)

(72) Inventors: Mingfeng Zhang, Scarborough (CA); Xing Yuan, Markham (CA)

(73) Assignee: Besnovo Technologies Inc., Ajax (CA)

( * ) Notice: Subject to any disclaimer, the term of this patent is extended or adjusted under 35 U.S.C. 154(b) by 407 days.

(21) Appl. No.: 17/816,419

(22) Filed: Jul. 31, 2022

(65) Prior Publication Data

US 2024/0033920 A1   Feb. 1, 2024

(51) Int. Cl.
| | |
|---|---|
| *B23K 26/16* | (2006.01) |
| *B23K 26/03* | (2006.01) |
| *B23K 26/362* | (2014.01) |
| *B23K 26/70* | (2014.01) |
| *B23K 37/02* | (2006.01) |
| *B25J 9/16* | (2006.01) |
| *B25J 11/00* | (2006.01) |
| *B25J 13/08* | (2006.01) |

(52) U.S. Cl.
CPC .......... *B25J 9/1666* (2013.01); *B23K 26/032* (2013.01); *B23K 26/16* (2013.01); *B23K 26/362* (2013.01); *B23K 26/703* (2015.10); *B23K 37/02* (2013.01); *B25J 9/1697* (2013.01); *B25J 11/005* (2013.01); *B25J 13/08* (2013.01); *G05B 2219/39001* (2013.01); *G05B 2219/40339* (2013.01)

(58) Field of Classification Search
None
See application file for complete search history.

(56) References Cited

U.S. PATENT DOCUMENTS

| | | | | |
|---|---|---|---|---|
| 6,339,605 B1 * | 1/2002 | Vetrovec | ............... | H01S 3/0606 |
| | | | | 359/333 |
| 2013/0270234 A1 * | 10/2013 | Thomas | ............... | B23K 26/032 |
| | | | | 356/600 |
| 2021/0362270 A1 * | 11/2021 | Dajnowski | ......... | B23K 26/1224 |

FOREIGN PATENT DOCUMENTS

| | | | | | |
|---|---|---|---|---|---|
| EP | | 4088855 B1 * | 1/2024 | ........... | B23K 26/032 |
| WO | WO-2022133330 A1 * | | 6/2022 | .............. | B22F 10/70 |

* cited by examiner

*Primary Examiner* — Thomas E Worden
*Assistant Examiner* — Bryant Tang

(57) ABSTRACT

The present disclosure provides an apparatus for removing coatings from objects' surface using laser. One exemplary apparatus includes a mobile manipulator carrying an optical device to apply laser to an object for removing the coatings on its surface. One aspect of this disclosure provides methods for sensing the geometry of the surface and the status of the coatings and controlling the motion of the manipulator and the laser settings according to the sensed information.

11 Claims, 7 Drawing Sheets

APPARATUS AND A METHOD FOR REMOVING COATINGS BY USING LASER

RELATED APPLICATIONS

Provisional application No. 63/230,468, filled on Aug. 6, 2021.

FIELD OF THE INVENTION

The present invention relates to a novel robotic de-coating system for and a method of applying laser to remove coatings from the surface of objects, especially large objects such as aircraft, vehicles, vessels, and bridges.

BACKGROUND OF THE INVENTION

Coatings on the surface of objects such as aircraft, vehicles, vessels, and bridges provide protection against corrosion as well as aesthetic appearance. The performance of coatings tends to degrade over time, and they must be removed and re-applied regularly. For example, the paint on aircraft must be removed and re-applied every few years according to aircraft maintenance manuals.

Existing approaches for coating removal mainly include chemical stripping, media blasting, and hand sanding. These methods are time-consuming, labor-intensive, and environmentally unfriendly. The secondary medium used by these methods and resulting waste generated in these processes are harmful to the environment, which must be collected and disposed properly according to strict procedures. For example, chemical stripping for aircraft uses a large amount of harmful solvent to strip paint, and this approach generates a large volume of hazardous waste. Besides, these methods present a very hazardous working environment for workers. As a result, workers must wear goggles, full-body protective suite, and other personal protective equipment in this kind environment.

Due to these drawbacks of the conventional methods, the aircraft maintenance industry has been looking for a green and more efficient alternative for many years. Laser has been considered and investigated as a viable alternative for its potential in improving the efficiency and reducing the environmental footprint of the de-coating process.

While many laser de-coating systems have been disclosed in prior art, the potential of laser de-coating is not fully achieved for processing very large objects and objects (e.g., aircraft) made of safety-critical materials. The first shortcoming of previous laser de-coating systems is their limited work envelope, which generally restricts them to processing small objects. Many laser de-coating systems disclosed in prior art were hand-held devices (U.S. Pat. No. 5,151,134) that should be operated manually. The manual operation mode suffers from low accuracy and limited efficiency and presents great safety risks to operators, making it less suitable for processing large objects or objects made of safety-critical materials. Some of previous laser de-coating systems were automated to some extent by small-scale gantries or robot arms (U.S. Pat. No. 5,864,114). The robotic elements enabled automatic laser de-coating operations of these systems, but they were still restricted to processing small objects due their limited work envelope. Processing a very large object such as a passenger aircraft or a ship was beyond the coverage of such systems.

The second major shortcoming of previous laser de-coating systems is the limited control in their de-coating process to prevent damage to substrate materials, especially to delicate or safety-critical materials. Closed-loop control using surface color (U.S. Pat. No. 9,375,807) or roughness feedback (U.S. Pat. No. 9,481,052) was adopted by several systems in prior art to improve laser de-coating's safety to substrates. The measured color or roughness information is compared with pre-defined specifications to determine the surface properties such as whether there is paint remaining or not. This requires prior knowledge of the coating on a given surface, which is usually difficult to obtain reliably because the paint scheme on an object may be not uniform on its surface. For example, aircraft are sometimes re-painted in a small portion of their surface during repairs, and this may be done without removing the old paint, resulting in paint that deviates greatly from specifications in terms of color and thickness. Besides, the color or surface roughness feedback is unable to accurately measure the exact amount of paint remaining on a surface and is thus insufficient to determine the most accurate laser parameters for de-coating.

Therefore, there is a need to integrate a large-scale robotic system with an expandable work envelope with laser de-coating for processing large objects such as passenger aircraft. In addition, more advanced techniques are required to improve the laser de-coating's safety for substrate materials.

SUMMARY OF THE INVENTION

The present disclosure provides a novel robotic laser de-coating system for stripping coatings from the surface of objects, especially from large objects such as passenger aircraft. One exemplary system consists of at least one laser module, one motion platform, one robotic module, and one fume extraction module, and it enables safe, automated, and efficient laser de-coating on the surface of small and large objects. The laser module consists of a laser generator and its supporting equipment such as a cooling unit, a laser scanner, a laser delivery system that transmits laser beam from the laser generator to the laser scanner, and other supporting equipment. The laser module further comprises perception and computing devices for sensing coating and substrate properties and may be configured to use the sensed information as feedback to enable closed-loop control of the laser de-coating process. In a preferred embodiment, the perception devices measure the paint thickness, recognize the substrate's material type, and detect the layers of paint on a given surface in a contactless manner, and laser parameters of the de-coating process are dynamically adjusted according to such measured information. The motion platform may comprise an automated vehicle and a lifting mechanism carrying the laser module, the robotic module, the fume extraction module, and other supporting modules and for providing mobility to them around a target surface. The robotic module may consist of a robotic manipulator for carrying and providing mobility to the laser scanner with respect to a target surface. It may be interfaced with perception and computing devices and configured to sense the target surface and to plan and execute its motion with respect to the target surface. The fume extraction system comprises at least a fume hood, a vacuum, and a hose connection them, and it actively collects and filters the waste generated in the laser paint removing process to prevent pollution to the environment.

One aspect of this disclosure provides methods for controlling the motion of the motion platform and the robotic module, sensing the property of a target surface, and controlling the laser de-coating process based on measured surface properties.

BRIEF DESCRIPTION OF DRAWINGS

Embodiments will now be described, by way of example only, with reference to the drawings, in which.

DETAILED DESCRIPTION OF THE INVENTION

Figure 1:
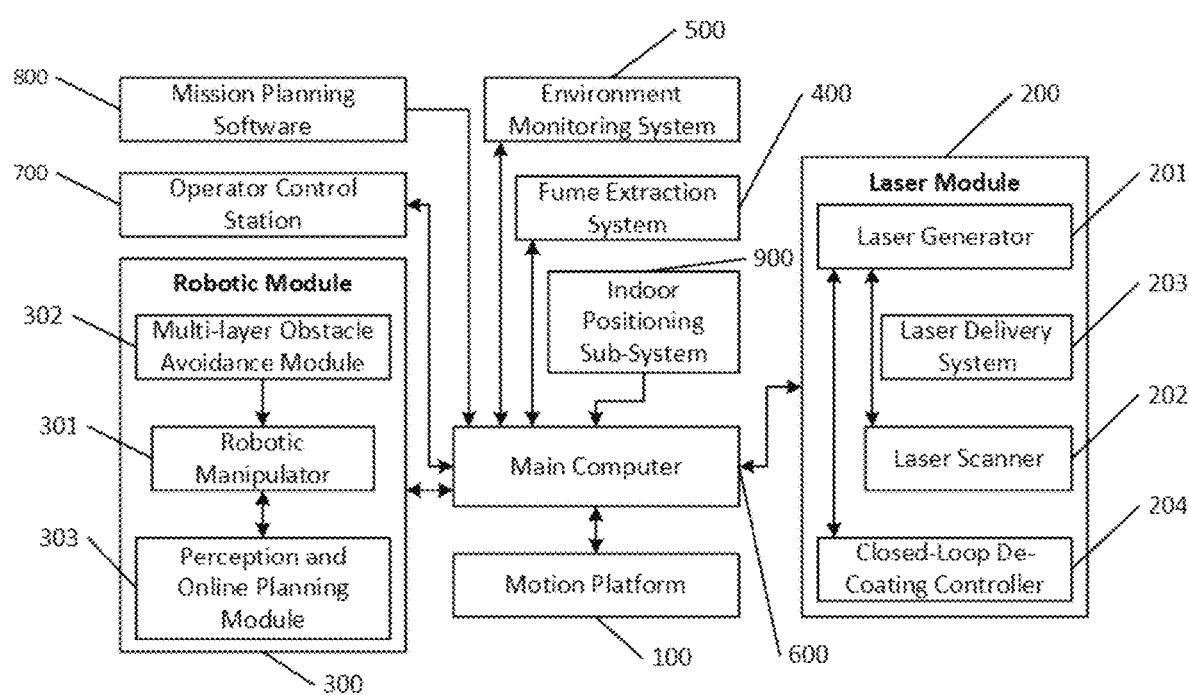
FIG. 1 shows a block diagram of the components of a laser-based de-coating system for removing coatings from a surface according to an embodiment of the invention.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps, or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "motion platform" refers to a device that can carry a payload and can be controlled to move the payload in 2D or 3D space. Examples of motion platforms include guiding frames, ground vehicles, robotic manipulators, multi-axis translation stages, and any combinations of these above. It may also include actuating devices that can be controlled by a separate controller.

As used herein, the term "work envelope" or "reach envelope" refers to a 3D shape that defines the boundaries that a motion platform's end effector can reach.

As used herein, the term "position and orientation" refers to an object's coordinates with respect to a fixed point together with its alignment (or bearing) with respect to a fixed axis. For example, the position and orientation of a motion platform might be the coordinates of a point on the motion platform together with the bearing of the motion platform (e.g., in degrees). The term "pose" is used interchangeably as a short form for "position and orientation".

As used herein, the term "path", "path of a motion platform", or "path of a robotic manipulator" refers to a sequence of poses (i.e., position and orientation) for the motion platform or the robotic manipulator.

As used herein, the term "job", "mission", "a de-coating job", or "a de-coating mission" refers to the task of de-coating a target surface (e.g., an aircraft's exterior surface, a region of an aircraft's exterior surface, a part's surface, etc.) to a required condition.

As used herein, the term "section" refers to a continuous portion of the target surface of a de-coating job. The target surface may be divided into multiple sections to be processed during de-coating. In other words, a job or a mission may consist of multiple sections.

As used herein, the term "patch" refers to a continuous portion of a section. A section may be divided into multiple patches to be processed during de-coating. In other words, a section may consist of multiple patches.

As used herein, the term "scan" refers to the process of deflecting a laser beam to fill the area requiring de-coating in a given patch in a pre-defined pattern. The filling pattern refers to the spatial layout of laser spots on a surface. For example, a common pattern is a grid, and the lateral and vertical spacing between laser spots is the key controlling parameter of the grid pattern.

As used herein, the term "pass" refers to the process of performing one single scan for each patch in a section. In other words, a pass is the period between the beginning of scanning the first patch of a section and the end of scanning the last patch of the section. Multiple passes are generally required to remove coating to a required condition because each pass may only remove a thin layer of the coating.

The present disclosure relates to an apparatus that uses a robotic system to delivery laser to remove coatings from the surface of an object. As required, preferred embodiments of the invention will be disclosed, by way of examples only, with reference to drawings. It should be understood that the invention can be embodied in many various and alternative forms. In other instances, well-known methods, procedures, and components have not been described in detail so as not to obscure the embodiments described herein. Also, the description is not to be considered as limiting the scope of the embodiments described herein.

The laser de-coating system as claimed provides a beneficial solution for removing coatings from the surface of various objects, especially on large objects with irregular geometric shapes and delicate materials. The motion platform of this system enables a large and flexible work envelope for removing coatings from the surface of large objects with various shapes and structures. Multiple sensors in this system can measure the motion platform and the robotic module's motion relative to the surface of a target object. The motion feedback enables the de-coating system to achieve high motion accuracy for controlling the motion of the laser scanner relative to the target surface. Additional sensors are used in this system to measure the coating and substrate properties of the surface of an object, which enable closed-loop control of the laser de-coating process to ensure substrate safety and improve de-coating efficiency.

The structure of the system for applying laser to the surface of an object to remove coatings on the surface will first be described.

Referring to FIG. 1, the laser de-coating system for removing coatings from a surface according to one embodiment is shown generally. Said system uses a motion platform 100 to carry a laser module 200, a robotic module 300, a fume extraction system 400, an environmental monitoring system 500, a main computer 600, and other supporting equipment. This system further comprises an operator control station 700 for operators to operate the system. It further comprises a piece of mission planning software 800 for generating a de-coating plan for performing a de-coating job. It further comprises an indoor positioning system 900 for the motion platform to localize itself in an indoor environment. In this embodiment, the motion platform 100 consists of a mobile vehicle and a lifting mechanism, and the robotic module 300 is installed on the lifting mechanism. The laser module consists of a laser generator 201 and its supporting equipment such a cooling unit for generating a laser beam, a laser scanner 202 for focusing and directing the laser beam to a target surface, a laser delivery system 203 that transmits laser beam from the laser generator 201 to the laser scanner 202, and a closed-loop de-coating process controller 204 for measuring coating and substrate properties and controlling laser de-coating parameters accordingly. The robotic module 300 comprises a robotic manipulator 301 for carrying and providing mobility to the laser scanner 202, sensors, and other supporting devices, a multi-layer obstacle avoidance module 302 for detecting and avoiding obstacles to the robotic manipulator's motion, and a perception and online planning module 303 for measuring a target surface and planning the motion of the robotic manipulator. The fume extraction system 400 comprises of a vacuum, a fume hood attached to the front face of the laser scanner 202, and a fume hose connecting the fume hood and the vacuum. The environmental monitoring system 500 comprises a plurality of sensors for the detecting the presence of gas and particles of certain compositions, and it further comprises a piece of software interfaced with these sensors for processing the measurements from these sensors and reporting the corresponding results.

In the various embodiments of the de-coating system, the motion platform 100 may be a guiding frame, a mobile vehicle, a multi-axis translational stage, a lifting mechanism, a multi-axis robotic manipulator, and an actuating device, or a combination of these modules.

In an embodiment, the motion platform 100 comprises an automated guided vehicle (AGV) and a robotic manipulator which is carried by the AGV. The motion of the AGV and the manipulator can be controlled in a coordinated or decoupled manner by a motion controller.

In an additional embodiment, the motion platform 100 comprises a multi-axis translational stage and a robotic manipulator, which is carried by the stage. The motion of the stage and the manipulator can be controlled in a coordinated or decoupled manner by a motion controller.

In an additional embodiment, the motion platform 100 may further include an actuating device mounted to an end effector of the robotic manipulator. The motion of the actuating device can be controlled in a decoupled manner at a different rate by a separate controller.

Figure 2:
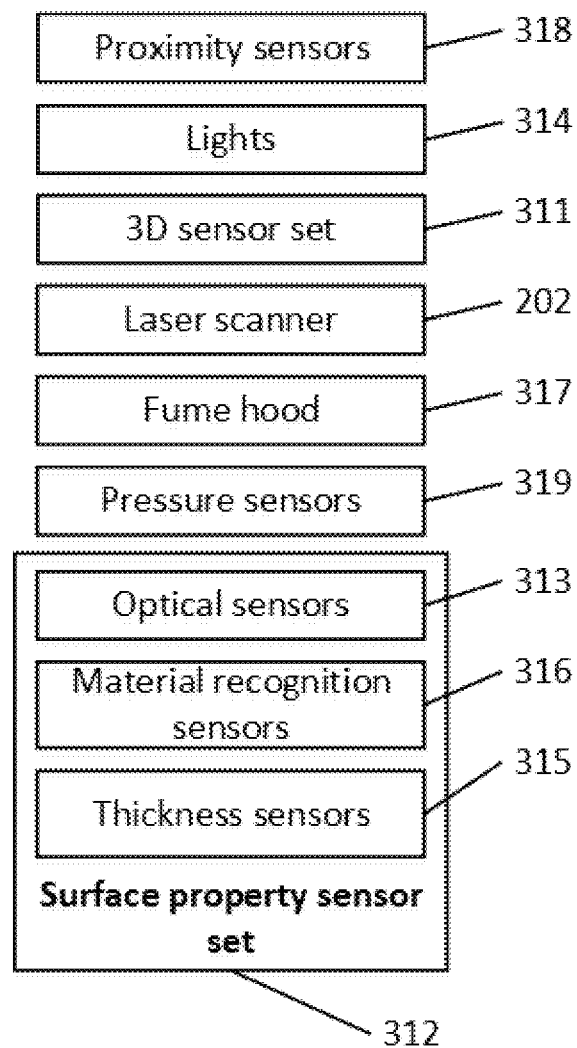
FIG. 2 shows a diagram of various devices attached to the end of a robotic module according to one embodiment of the invention, including a laser scanner for directing a laser beam to a surface to remove coatings, a fume hood for collecting particles and dust generated in the coating removing process, a set of surface property sensors for measuring the material properties of a surface and the thickness of coatings on the surface, and a set of 3D sensors for measuring point clouds of a surface.

Referring to FIG. 2, a diagram of various devices and sensors attached to the end of said robotic manipulator 301 is shown according to one embodiment of the invention. In this embodiment, the 3D sensor set 311 comprises one or more depth sensors for capturing point clouds of a surface. The surface property sensor set 312 comprises a plurality of optical sensors 313 for take images of a surface, a plurality of coating thickness sensors 315 for measuring the thickness of coatings on a surface, and a plurality of material recognition sensors 316 for identifying material types of substrates. The optical sensors capture images of the target surface, which are used to recognize the layer of paint on the surface. A plurality of lights 314 for shining the area of a surface being observed by various sensors are also installed on the end of the robotic manipulator 301. The laser scanner 202 is mounted to the end of the robotic manipulator, and a fume hood 317 is attached to the front face of the laser scanner 202. A plurality of proximity sensors 318 is mounted at selected locations at the end of the robotic manipulator 301 and are interfaced with a piece of software. The proximity sensors 318 measure the distance from the outline of robotic manipulator's end-effector to other objects, and the measured distance information is passed to a piece of software which triggers an emergency action such as suspending the robotic manipulator's motion if the distance is below a predefined threshold. In addition, a plurality of pressure sensors 319 such as pressure strips is attached to the front edges of the fume hood 317 for detecting collision with other objects. These sensors are interfaced with a piece of software which monitors their signals. The software triggers an emergency action such as suspending the robotic manipulator's motion if it reads a signal that corresponds to a contact between any of the force sensors and another object.

In an additional embodiment, the 3D sensors 311 are a plurality of laser range finders that use laser and the time-of-flight principle to measure distance. In another embodiment, the 3D sensors 311 are one or more line-scanners for that use laser and the time-of-flight principle to capture point clouds of an object.

In an additional embodiment, the surface property sensor set 312 may further comprise hyperspectral, multispectral sensors, or a combination of both for identifying materials by capturing a wide range of electromagnetic spectrum.

Figure 3:
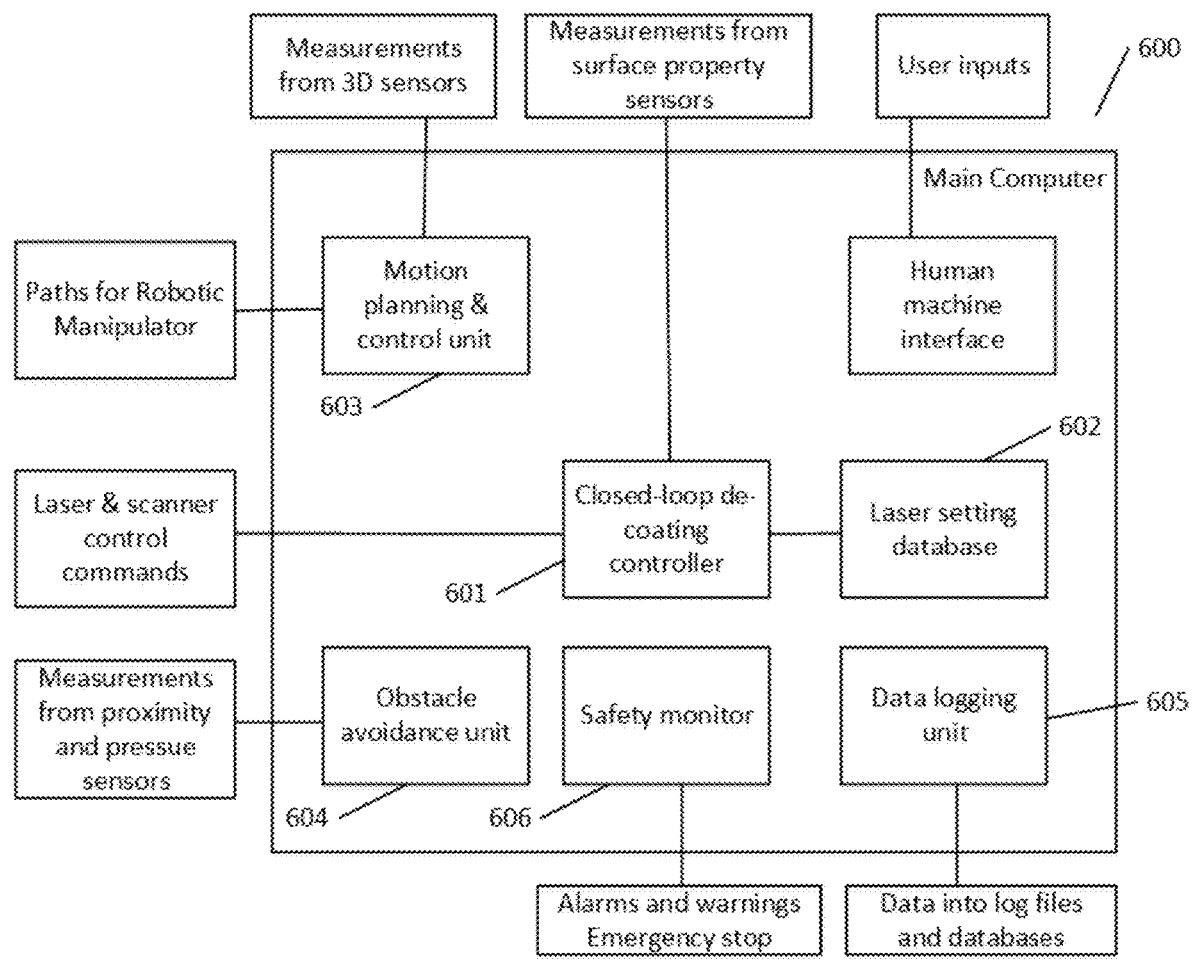
FIG. 3 is a block diagram the system's main computer and the software modules running on this computer according to one embodiment of the invention

Referring to FIG. 3, a diagram of software units on the main computer 600 according to an embodiment is shown generally. The main computer 600 is a computing device running a real-time operating system, said computer being interfaced with said laser generator 201, said laser scanner 202, said robotic manipulator 301, said motion platform 100, said 3D sensor set 311, and said surface property sensor set 312, said proximity sensor set 318, said lights 314, and being programmed with instructions to process and fuse sensor measurements, control the motion of the robotic manipulator 301 and the motion platform 100, and manage the de-coating process of the laser scanner 202. The closed-loop de-coating controller 601 is interfaced with the surface property sensors 312, the laser scanner 202, and the laser generator 201, and it is programmed with instructions for analyzing the measurements of surface property sensors 312 to estimate the paint thickness on a target surface, recognize the substrate material types, and recognize the layers of paint remaining on the surface, subsequently for retrieving laser parameters from a database 602 according to the measured information, and passing the parameters to the laser scanner and the laser generator to execute a de-coating task using the selected laser parameters. The robot motion planning and control unit 603 is interfaced with the 3D sensor set 311 and the robotic manipulator 301, and it is programmed with instructions to receive point cloud measurements of a target surface from the 3D sensors 312, create a 3D model of the target surface using the measured point clouds, detect obstacles and areas that should not be processed by laser de-coating, generate a feasible path for the robotic manipulator 301 to cover this surface, and control the robotic manipulator 301 to follow this path. The obstacle avoidance unit 604 is interfaced with the proximity sensors 318 and the pressure sensors 319, and it is programmed with instructions to receive and analyze measures from the proximity and force sensors and to trigger an emergency action such as suspending the motion of the robotic manipulator 301 when the measurements of the proximity sensors 318 or the pressure sensors 319 are within some pre-defined ranges. The data logging unit 605 can log one or more types of the input and output data from the motion platform 100, the laser module 200, the robotic module 300, the fume extraction system 400, the environmental monitoring system 500, the operator control station 700, and the indoor positioning system 900. Logged data may be written into and stored in various storage mediums, such as computer memory, local hard drives, and external databases for both runtime access and post-operation analysis.

The safety monitor 606 is interfaced with the motion platform 100, the laser module 200, the robotic module 300, the fume extraction system 400, the environmental monitoring system 500, the operator control station 700, and the indoor positioning system 900, and it monitors operational status of these devices and violation of safety conditions (e.g., collision, loss of power, device failure, out of calibration), provides notifications (e.g., audible and/or visible alarm, warning message) to operators, and slows down or stops the system's motion and operation in the occurrence of an emergency.

In an embodiment, the operator control station 700 is interfaced with the main computer 600, and it provides graphical views of live and historical data reported by the laser de-coating system to operators. An operator can select a de-coating program to be executed by the system and can control the program's execution (e.g., start, stop, pause, and resume) through the tools provided by the operator control station 700. The operator control station 700 further comprises emergency switches for operators to suspend the operation of the system in the occurrence of an emergency.

The method of the present laser de-coating system for performing de-coatings tasks includes multiple operational steps.

First, an off-line mission planning step is performed for acquiring a 3D representation of a target surface and generating one or more paths for the motion platform of one or more laser de-coating systems to follow. Obstacles and areas that should not be processed by laser de-coating are identified, and the paths are generated accordingly to avoid these objects. The paths generated in the off-line programming step will be used as pre-planned paths to guide to the motion platform to move the laser de-coating system to various locations around the target surface to perform laser de-coating. Afterwards, the de-coating step is executed by controlling the motion platform to move the laser de-coating system, controlling the robotic manipulator to move the laser scanner, and controlling the laser scanner to apply laser.

Figure 4:
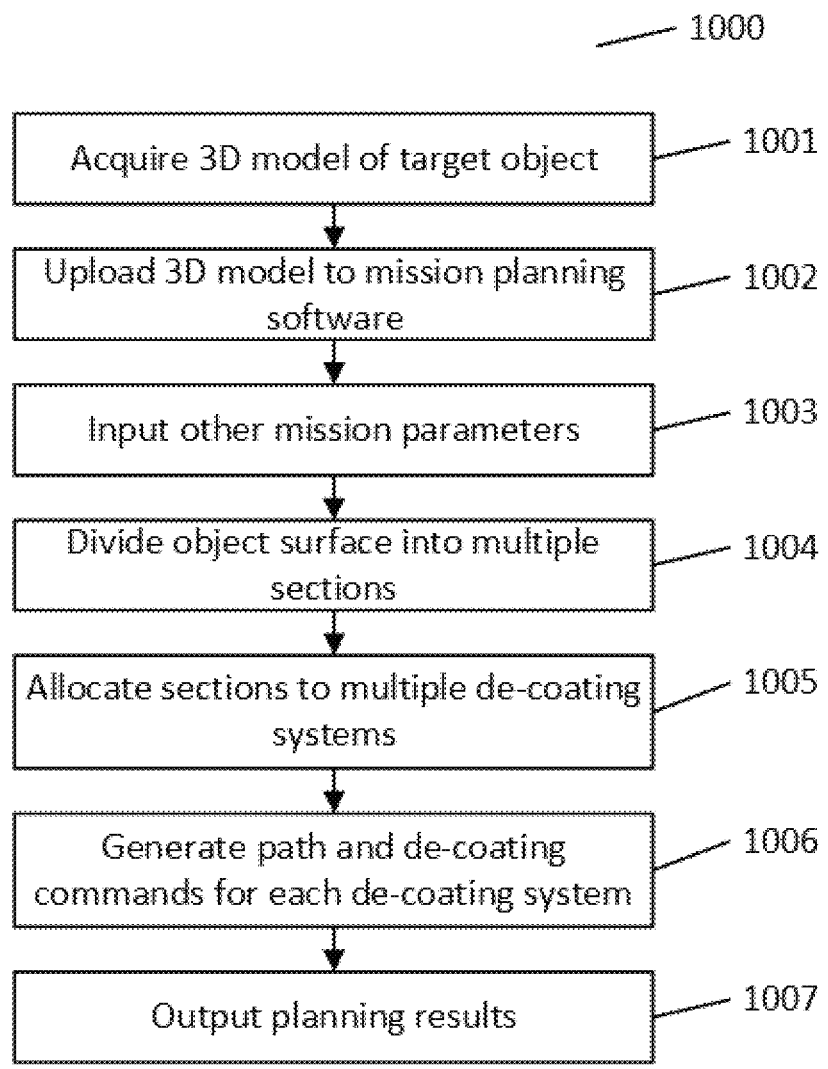
FIG. 4 shows the operational steps for off-line mission planning for a de-coating mission according to an embodiment of the invention.

An embodiment of the operational workflow of off-line mission planning is shown in FIG. 4, where the off-line mission planning first divides a de-coating mission into multiple sections and generates paths to guide the motion platform to move the laser de-coating system to the locations corresponding each section. The motion platform remains stationary at each location while its robotic manipulator positions the laser scanner and sensors relative to the section or sections of the target surface corresponding to this location to perform de-coating. The workflow of the off-line mission planning step 1000 includes several sub-steps. The step 1001 involves acquiring a 3D model of the target surface, which is uploaded to the mission planning software in step 1002. Afterwards, in step 1003 operators input settings of the de-coating job such as specifying areas to be de-coated or areas not to be de-coated. The mission planning software then divides the target surface into multiple sections in step 1004. In step 1005, the software allocates the sections to de-coating systems if multiple de-coatings are used concurrently for the de-coating job. If only one de-coating system is used, all sections are allocated to this system in this step. In step 1006, the software generates a path for each motion platform to visit each section. In the last step 1007, the software outputs the planning results, which can be then uploaded to the laser de-coating systems to perform the de-coating job.

For a preferred embodiment of this disclosure, the section's size used in step 1004 is within the work envelope of the robotic manipulator with its base remains stationary.

Figure 5:
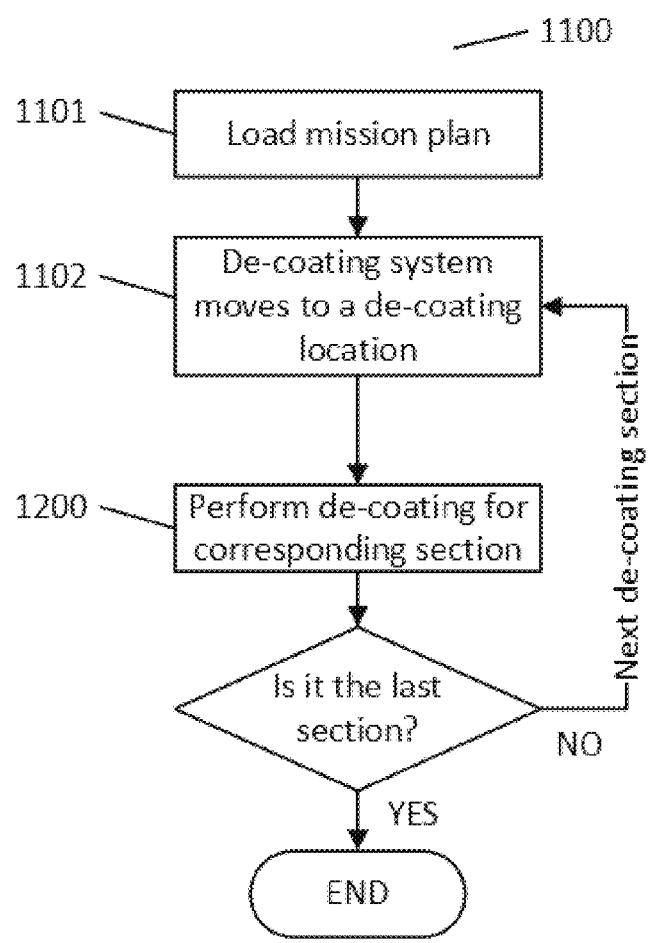
FIG. 5 shows the operational steps of executing a de-coating mission plan according to one embodiment of the invention.

Referring to FIG. 5, an embodiment of the operational workflow of the execution of de-coating 1100 is shown. The de-coating mission plan generated by the mission planning software is first uploaded to the de-coating system or systems in step 1101. The motion platform in step 1102 moves to the location corresponding to the first section assigned to it and stays there, and then the de-coating system in step 1200 performs de-coating for this section. The de-coating system repeats steps 1102 and 1200 for subsequent sections until it completes processing all sections assigned to it.

Figure 6:
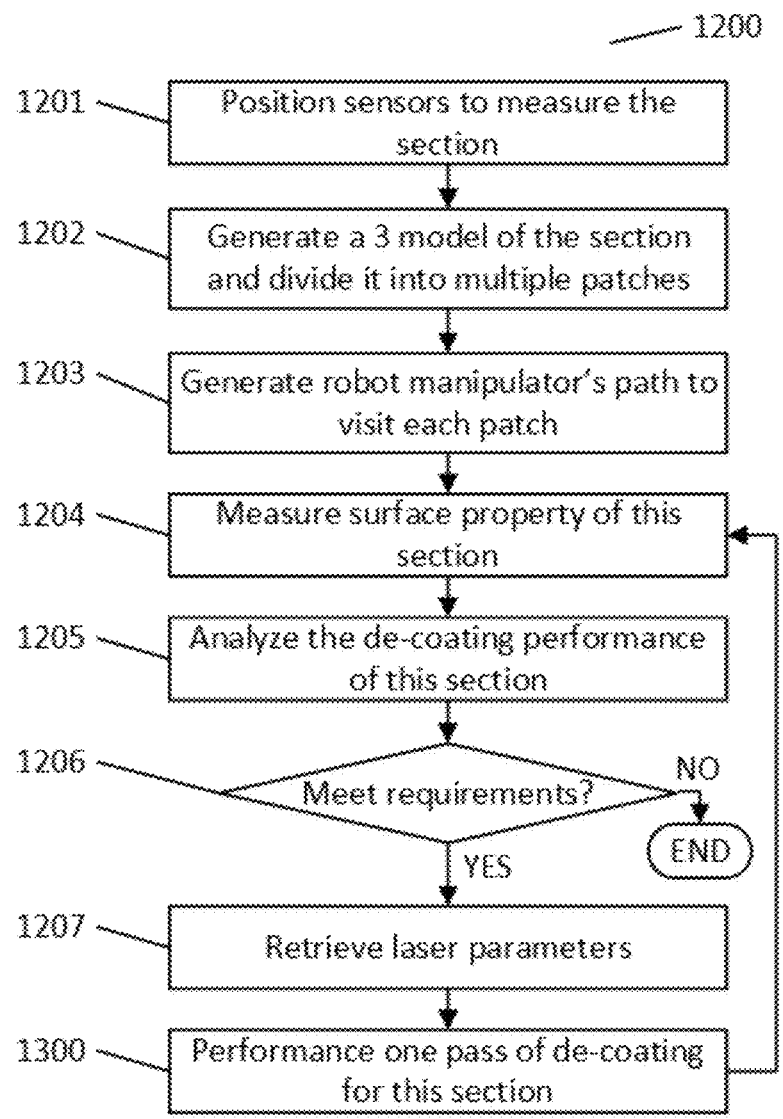
FIG. 6 shows the operational steps of performing de-coating for one section of a target surface according to one embodiment of the invention.

Referring to FIG. 6, an embodiment of the operational workflow of the step 1200 for de-coating a section can be further broken down into the following sub-steps. The robotic manipulator positions depth sensors to obtain a plurality of point clouds of the section in step 1201. The point clouds are subsequently merged to create a 3D model of the section, and this section is divided into multiple patches in step 1202 using this model. A path for the robotic manipulator to visit the patches in a sequence is subsequently generated in step 1203. The robotic manipulator in step 1204 positions surface property sensors to measure paint thickness, identify substrate material types, and acquire visual images of the surface. A thickness map is then produced, which is augmented by a map of paint layer information and substrate material types in step 1205. Using the sensed information, the system then determines if this section has been de-coated to required conditions in step 1206. If the required conditions are met, the system exits processing this section. Otherwise, it continues to the next step 1207, in which a set of laser parameters is retrieved from a database according to the thickness map, the paint layer map, and the substrate material type. The robotic manipulator in step 1300 positions the laser scanner to perform one pass of de-coating for all the patches in this section using the selected parameter set. Afterwards, the system goes back to step 1204 and repeats the subsequent steps until this section is processed to the required conditions.

Figure 7:
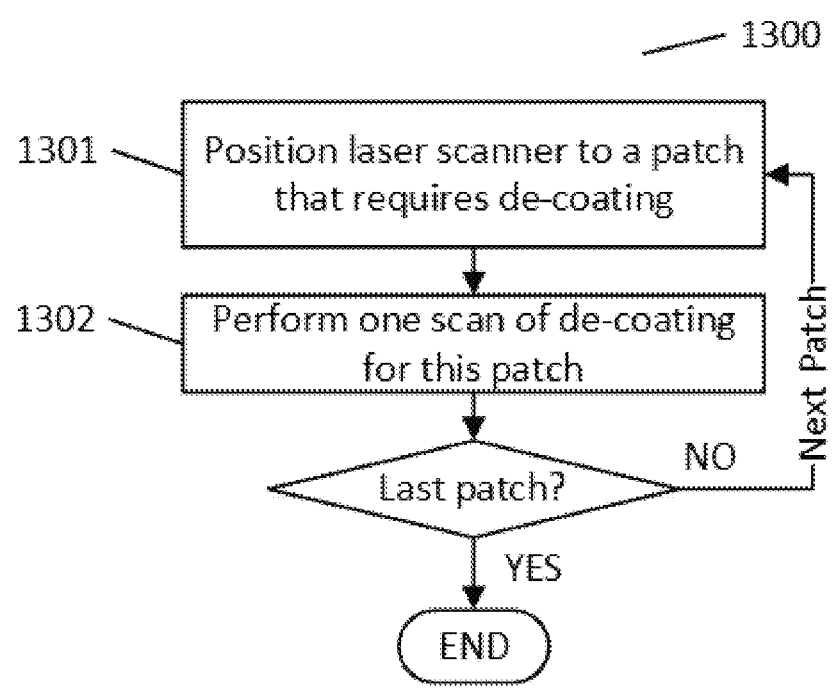
FIG. 7 shows the operational steps of performing one pass of de-coating for one section of a target surface according to one embodiment of the invention.

Referring to FIG. 7, an embodiment of the operational workflow of the step 1300 for performing one pass of de-coating for patches in a section can be further broken into the following sub-steps. The robotic manipulator positions the scanner to the first patch that requires de-coating in this section in step 1301. The scanner then applies laser according to the selected laser parameters to perform one scan for this patch in step 1302. The system repeats steps 1301 and 1302 until each patch requiring de-coating is processed by one scan.

In another embodiment, the operational steps of measuring surface property and analyzing de-coating performance (i.e., step 1204, 1205, and 1206) may be conducted for each patch prior to step 1301 instead of for each section.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore, what is claimed is:

1. An apparatus for applying laser to an object to remove coatings on its surface, comprising:
    a laser module for generating and transmitting a laser beam and for deflecting and projecting said laser beam to the surface of said object, comprising:
        a laser generator for generating a laser beam;
        a laser scanner for deflecting and projecting said laser beam to said surface;
        a laser beam delivery system for transmitting said laser beam from said laser generator to said laser scanner; and
        one or more sources of cooling medium to cool some components of said laser generator, said laser beam delivery system, and said laser scanner; and
    a robotic module for carrying and moving said laser scanner to reach the various areas of said surface;
    a motion platform for carrying said laser module, said robotic module, and other supporting equipment and moving them around said object;
    a fume extraction system for extracting and filtering by-products that are generated by the interaction between said laser beam and the coatings on said surface, comprising
        a fume hood for containing by-products in the proximity where laser interacts with the coatings on the object;
        a vacuum for sucking the air and particles from said fume hood and filter the captured matters; and
        a hose for connecting said fume hood and said vacuum; and
    a main computer interfaced with the laser module, robotic module, motion platform, and fume extraction system.

2. The apparatus according to claim 1, wherein the robotic module comprises any of one or more multi-axis robotic manipulator, one or more multi-axis gantry, one or more lifting devices, one or more actuating devices, or a combination thereof.

3. The apparatus according to claim 1, wherein the robotic module further comprises any one of a combination of:
    a surface property sensor set comprising:
        one or more optical sensors for acquiring images;
        one or more paint thickness sensors for measuring the thickness of paint and coatings; and
        one or more material recognition sensors for detecting the material types of the substrate under coatings; and
    a 3D sensor set comprising one or more 3D sensors for capturing 3D images of said object;
    one or more proximity sensors for measuring the distance to the surface of said object;
    one or more lighting sources for illuminating the surface of said object; and
    one or more pressure sensors for detecting contact with the object.

4. The apparatus according to claim 1, wherein the motion platform comprises any of a mobile vehicle, a multi-axis translation stage, a guiding frame, or a combination of thereof.

5. The apparatus according to claim 1 further comprises:
    a mission planning software module for dividing an object's surface into multiple sections, assigning the sections to one or more laser de-coating systems, and generating a sequence of way-points for said laser de-coating systems to reach the assigned sections;
    an indoor positioning system for providing positioning information for said motion platform in indoor environments;
    an operator control station for providing an interface for human supervisors to monitor and control the operation of said laser de-coating system; and
    an environment monitoring system for monitoring the concentration of by-products in the operating environment of said laser de-coating system.

6. The system according to claim 1, wherein the main computer is programmed with instructions to analyze a plurality of measurements from the surface property sensor set to detect the existence and distribution of coatings, to detect the material type of the substrate, and to measure the thickness of the coatings.

7. The system according to claim 1, wherein the main computer is programmed with instructions to analyze a plurality of measurements from the 3D sensors and 2D cameras to reconstruct a 3D digital model of a surface, to detect obstacles on the surface, and to generate one or more paths for said robotic module to traverse said surface.

8. The system according to claim 1, wherein the main computer is programmed with instructions to analyze a plurality of measurements from the proximity sensors to monitor their distance to a surface and trigger an emergency response if the distance is below a threshold.

9. The system according to claim 1, wherein the main computer is a computing device programmed with instructions to analyze a plurality of measurements from the pressure sensors to detect collision with an object and trigger an emergency response if a collision is detected.

10. The system according to claim 1, wherein the main computer is programmed with instructions to adjust the setting of the laser scanner and the laser generator by analyzing the measurements obtained by the surface property sensor set.

11. The system according to claim 1, wherein the main computer is programmed with instructions to control the motion of the motion platform and the robotic module.

* * * * *